W. E. SULLIVAN.
SHAFT COUPLING.
APPLICATION FILED AUG. 13, 1919.
1,356,024. Patented Oct. 19, 1920.
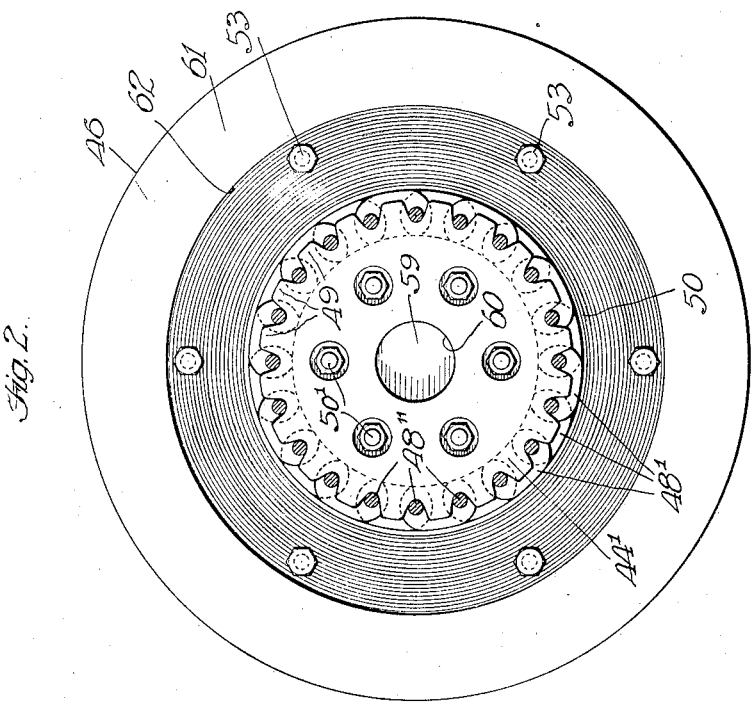
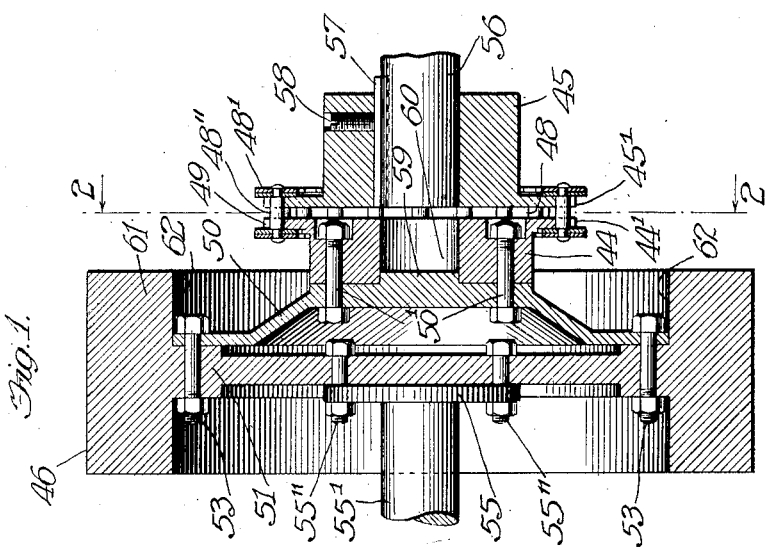

UNITED STATES PATENT OFFICE.

WILLIAM E. SULLIVAN, OF ROODHOUSE, ILLINOIS.

SHAFT-COUPLING.

1,356,024.  Specification of Letters Patent.  Patented Oct. 19, 1920.

Original application filed August 2, 1918, Serial No. 248,024. Divided and this application filed August 13, 1919. Serial No. 317,169.

*To all whom it may concern:*

Be it known that I, WILLIAM E. SULLIVAN, a citizen of the United States of America, and a resident of Roodhouse, county of Greene, and State of Illinois, have invented certain new and useful Improvements in Shaft-Couplings, of which the following is a specification.

This invention relates to flexible connections for power shafts, and especially to means for mounting the coupling proper on the power shafts of direct connected engine-dynamo units, such as shown in my copending parent application, Serial No. 248,024, from which this case is divided.

The main objects of the invention are to provide an improved and simplified form of connecting means for securing a flexible coupling to the adjacent parts of the machines or shafts to be joined; to provide for applying the torque directly to the fly-wheel and for distributing the torque about a large peripheral zone thereon; and to provide especially for applying the so-called "Clark" coupling in the manner specified.

An illustrative embodiment of this invention is shown in the accompanying drawings, in which—

Figure 1 is an axial section through the coupling.

Fig. 2 is a section on the line 2—2 of Fig. 1.

In the construction shown in the drawings, the shaft connection comprises a pair of complementary members 44 and 45 secured one to the fly wheel 46 of the engine and the other to the generator shaft and a member 48 connecting same together somewhat loosely. Said members 44 and 45 are in the form of hubs with plate-like flanges 44' and 45' having sprocket teeth 49, and the yielding member 48 is in the form of a loose fitting sprocket chain, which is adapted to take up vibrations and absorb shocks, and includes links 48' and cross-bars 48". The adjacent toothed flanges 44' and 45' connected by the sprocket chain are normally spaced apart somewhat and the chain 48 fits somewhat loosely, so that the shafts are connected flexibly enough to avoid trouble, both as to bending and as to end thrusts.

The member 44 is provided with an outwardly extending flange 50 fastened thereto by bolts 50', which flange is disposed against the radial web 51 of the fly wheel 46 to which it is detachably secured by bolts 53, said fly wheel being fixed on the end flange 55 of the engine shaft 55' by bolts 55". The flange plate 50 is dished.

The member 45 is fixed on the end of the generator shaft 56 by means of the key 57 and set screw 58 as understood in the art.

The bars 48" are thickened medially and provided with shoulders to hold the links apart in duly spaced relation, and the ends are riveted to secure the links in place. In order to permit of ready connection of the member 44 to the flange-plate 50, the latter is provided with a square shouldered boss 59 fitting accurately in the bore 60 of part 44, whereby said members may be quickly centered ready for bolting. True centering of the coupling-plate 50 on the fly-wheel 46 is assured by turning the outer edge of said plate to a jig fit, and also jig counterboring the inner side of flange 61 at 62.

Although but one specific embodiment of this invention is herein shown and described, it will be understood that some of the details of the construction shown may be altered or omitted without departing from the spirit of this invention as defined by the following claims.

I claim:

1. In combination a pair of shafts spaced apart in alinement, a fly-wheel fixed directly to the inner end of one of said shafts, a flexible coupling having one of its relatively movable parts fixed directly to the inner end of the opposite shaft and a dished plate disposed with its concave side toward said fly-wheel, its outer part being attached positively to said fly-wheel and its inner part being attached positively to the complementary part of said coupling for coturning of said shafts.

2. A device of the character described, comprising a pair of shafts substantially in alinement, one shaft having a fly-wheel and the other a flexible coupling fixed thereon respectively adjacent to each other, said fly-wheel having a flange-plate positively secured near its outer edge to said fly-wheel in coaxial relation, said plate and coupling being connected coturnably relatively near their common axis.

3. Means adapted for operatively connecting a fly-wheel to a coupling member having a hollow ended hub, said means being in the form of a dished plate having a centering boss fitting the hub aperture.

4. Means adapted for operatively connecting a rimmed fly-wheel to a coupling member having a central hub, said means being in the form of a dished plate having an outer radial flange part fitting the inner side of the fly-wheel rim for mutually centering the same.

Signed at Roodhouse this eighth day of August, 1919.

WILLIAM E. SULLIVAN.